US008335268B2

(12) United States Patent
Lee et al.

(10) Patent No.: US 8,335,268 B2
(45) Date of Patent: Dec. 18, 2012

(54) SIGNAL TRANSMISSION SYSTEM USING MULTIPLE ANTENNA AND SIGNAL TRANSMISSION METHOD THEREOF

(75) Inventors: Seung-Joon Lee, Daejeon (KR); Dong-Seung Kwon, Daejeon (KR)

(73) Assignees: Samsung Electronics Co., Ltd., Suwon-si (KR); Electronics and Telecommunications Research Inst., Daejeon (KR)

( * ) Notice: Subject to any disclaimer, the term of this patent is extended or adjusted under 35 U.S.C. 154(b) by 247 days.

(21) Appl. No.: 12/445,120

(22) PCT Filed: Sep. 21, 2007

(86) PCT No.: PCT/KR2007/004685
§ 371 (c)(1),
(2), (4) Date: Apr. 10, 2009

(87) PCT Pub. No.: WO2008/044830
PCT Pub. Date: Apr. 17, 2008

(65) Prior Publication Data
US 2010/0091896 A1 Apr. 15, 2010

(30) Foreign Application Priority Data

Oct. 10, 2006 (KR) .................. 10-2006-0098439
Mar. 30, 2007 (KR) .................. 10-2007-0031354

(51) Int. Cl.
*H04K 1/10* (2006.01)
*H04L 27/28* (2006.01)
(52) U.S. Cl. ...................... 375/260; 375/267
(58) Field of Classification Search ............ 375/260, 375/267
See application file for complete search history.

(56) References Cited

U.S. PATENT DOCUMENTS

| 6,687,307 | B1 | 2/2004 | Anikhindi et al. |
| 7,573,806 | B2 * | 8/2009 | Ihm et al. ............ 370/208 |
| 7,684,765 | B2 * | 3/2010 | Song ............... 455/78 |
| 2003/0202460 | A1 | 10/2003 | Jung et al. |
| 2004/0008616 | A1 | 1/2004 | Jung et al. |
| 2005/0078763 | A1 | 4/2005 | Choi et al. |
| 2005/0201309 | A1 * | 9/2005 | Kang et al. .......... 370/310 |

(Continued)

FOREIGN PATENT DOCUMENTS

JP 2000-22656 A 1/2000

(Continued)

OTHER PUBLICATIONS

PCT/KR2007/004685 Written Opinion of the International Search Authority, Apr. 10, 2009.*

(Continued)

*Primary Examiner* — Shuwang Liu
*Assistant Examiner* — Nader Bolourchi
(74) *Attorney, Agent, or Firm* — Jefferson IP Law, LLP

(57) ABSTRACT

The present invention relates to a multiple antenna transmission system and a signal transmission method In the signal transmission method using multiple antennas, a plurality of subcarrier symbols are grouped as a plurality of groups including first and second tiles that are basic resource management units including two or more subcarriers included in a set frequency domain, phases of subcarrier symbols included in a first tile are shifted to be a first phase shifting value, and phases of subcarrier symbols included in a second tile are shifted to be a second phase shifting value that is different from the first phase shifting value.

8 Claims, 2 Drawing Sheets

U.S. PATENT DOCUMENTS

| | | | |
|---|---|---|---|
| 2005/0201327 A1* | 9/2005 | Kim et al. | 370/329 |
| 2005/0286402 A1 | 12/2005 | Byun et al. | |
| 2009/0225704 A1* | 9/2009 | Lee et al. | 370/329 |
| 2009/0310656 A1* | 12/2009 | Maltsev et al. | 375/219 |

FOREIGN PATENT DOCUMENTS

| | | |
|---|---|---|
| JP | 2002-314501 A | 10/2002 |
| KR | 10-2007-0093787 A | 9/2007 |
| WO | 2007/105904 A2 | 9/2007 |

OTHER PUBLICATIONS

PCT/KR2007/004685 International Preliminary Report on Patentability Chapter I, Apr. 15, 2009.*

Jun Tan et al., Multicarrier Delay Diversity Modulation for MIMO Systems, IEEE Transactions on Wireless Communications, Sep. 2004.

* cited by examiner

SIGNAL TRANSMISSION SYSTEM USING MULTIPLE ANTENNA AND SIGNAL TRANSMISSION METHOD THEREOF

TECHNICAL FIELD

The present invention relates to a multiple antenna transmission system and a signal transmitting method using the multiple antenna transmission system.

BACKGROUND ART

In a multiple antenna communication system, a diversity gain and receiving complexity are important standards for designing a signal transmitting apparatus. Among multiple antenna transmission methods for obtaining a maximum diversity gain, a cyclic delay diversity transmission method has been proposed. In this method, the same signal is transmitted through the same subcarrier to all transmitting antennas, and different cyclic delays are provided to the respective antennas. That is, since the different delay times are provided for the respective transmitting antennas when transmitting the signal by using the multiple antennas, frequency diversity is artificially added. Accordingly, when one channel encoding frame is transmitted through a plurality of subcarriers in a multi-carrier system such as an orthogonal frequency division multiplexing (OFDM) system, receiving quality may be improved by using the frequency diversity added by a channel decoding unit.

When cyclic delay diversity is realized at a frequency domain, $\tau_t$ denotes a cyclic delay value corresponding to an antenna t, $f_h$ denotes a subcarrier frequency, and a phase shifting value is given as $$\Phi = -2\pi\tau_t f_h.$$

In this case, when it is assumed that a pilot signal is transmitted by using the cyclic delay diversity transmission method, a trade-off effect may occur between a frequency diversity gain and channel estimation performance according to the cyclic delay value. That is, when the cyclic delay value increases, the frequency diversity gain increases, but the channel estimation performance is deteriorated. In addition, since the frequency diversity gain may not be obtained when the cyclic delay value is decreased to be lower than a predetermined value to increase the channel estimation performance, the purpose of using the multiple antennas may be lost. Therefore, a transmission method for simultaneously maximizing the channel estimation performance and the frequency diversity gain is highly required.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a multiple antenna transmission system for simultaneously maximizing channel estimation performance and a frequency diversity gain, and a signal transmission method using the multiple antenna transmission system.

Technical Solution

In an exemplary signal transmission method using multiple antennas according to an embodiment of the present invention, a plurality of subcarrier symbols are grouped as a plurality of groups including first and second tiles that are basic resource management units including two or more subcarriers included in a set frequency domain, phases of subcarrier symbols included in a first tile are shifted to be a first phase shifting value, and phases of subcarrier symbols included in a second tile are shifted to be a second phase shifting value that is different from the first phase shifting value.

An exemplary multiple antenna transmission system according to an embodiment of the present invention includes two or more phase shifting units, two or more inverse fast Fourier transform (IFFT) units, and two or more antennas. The two or more phase shifting units include a plurality of phase shifter groups respectively corresponding to a plurality of tiles that are basic resource management units including two or more subcarriers included in a set frequency domain. The two or more IFFT units multiplex an output signal of one corresponding phase shifting unit, and convert the output signal to be a time domain signal. The two or more antennas transmit the output signal of one corresponding IFFT unit.

ADVANTAGEOUS EFFECTS

According to the exemplary embodiment of the present invention, the multiple antenna transmission system for increasing the frequency diversity gain and improving the channel estimation performance at the receiving terminal, and the signal transmission method using the multiple antenna transmission system may be realized.

MODE FOR THE INVENTION

Figure 1:
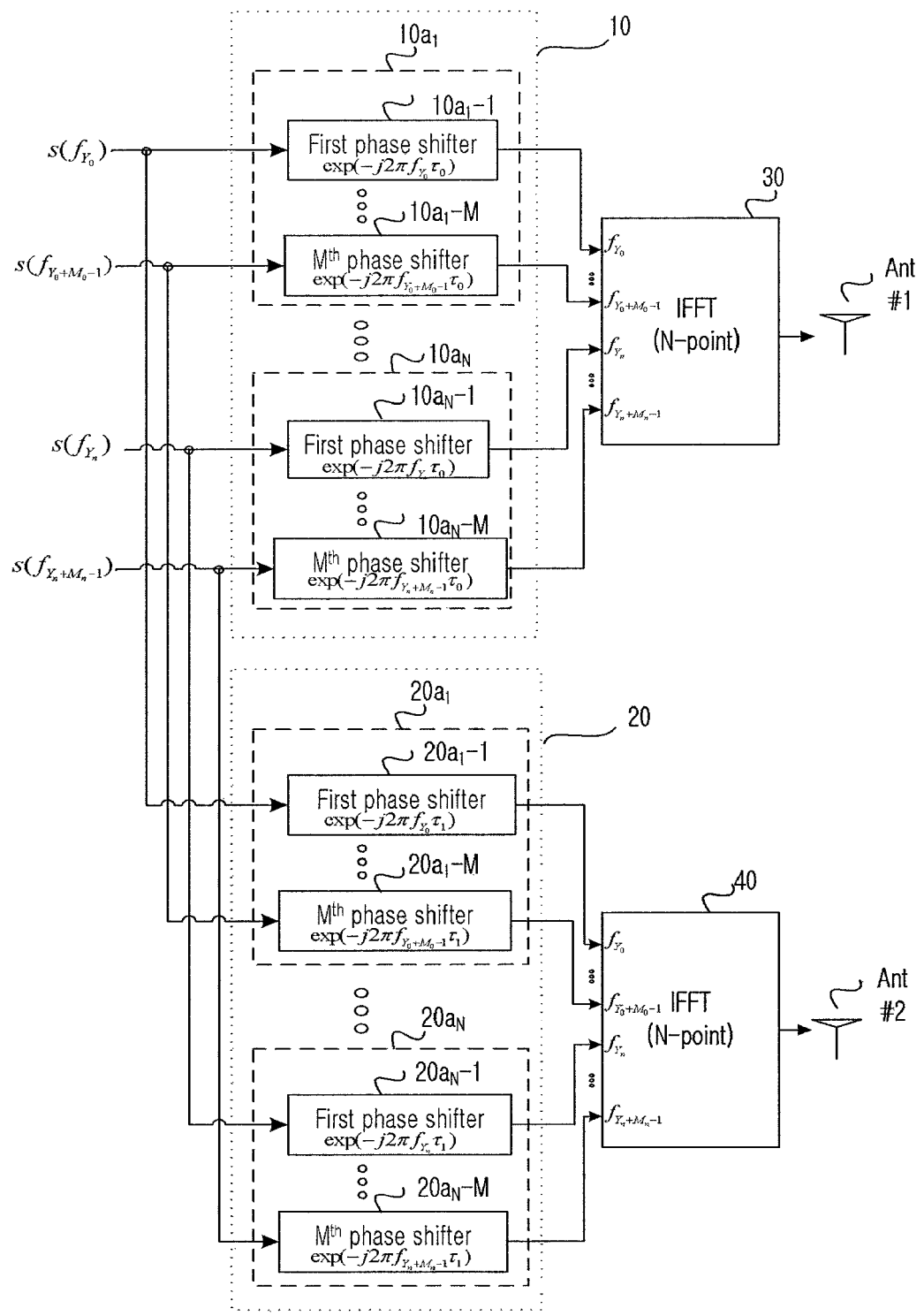
FIG. 1 is a block diagram representing a signal transmitting method using conventional multiple antennas.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, the terms "Module", "Unit" and "Block" used herein respectively mean one unit that processes a specific function or operation, and may be implemented by hardware or software and a combination thereof.

A multiple antenna transmission system according to an exemplary embodiment of the present invention and a signal transmitting method using the multiple antenna transmission system will be described with reference to the figures.

While the multiple antenna transmission system generally includes two or more antennas, only two antennas ANT #1 and ANT #2 are illustrated in the exemplary embodiment of the present invention for convenience of description. In addition, in an orthogonal frequency division multiplexing (OFDM) system, a plurality of subcarriers included in a predetermined frequency domain are grouped to be used as basic units of one resource management, and the basic units will be referred to as "tiles" In FIG. 1 and FIG. 2, when $S(f_i)$ denotes an input symbol to be transmitted to correspond to a subcarrier $f_i$ and a phase shifting value established at each phase shifter is $-\Phi$, the phase shifting value is shown as $\exp(-j\Phi)$ in each phase. That is, the corresponding phase shifter multiplies the input symbol by $\exp(-j\Phi)$. Further, $\tau_0$ and $\tau_1$ respectively denote cyclic delay values respectively corresponding to the antenna ANT #1 and the antenna ANT #2.

FIG. 1 is a block diagram representing a signal transmitting method using conventional multiple antennas.

As shown in FIG. 1, a conventional multiple antenna transmission system includes first and second phase shifting units 10 and 20, first and second inverse fast Fourier transformers (IFFT) 30 and 40, and a plurality of antennas ANT #1 and ANT #2.

The first phase shifting unit 10 includes phase shifter groups $10a_1, \ldots,$ and $10a_N$ for processing input symbols respectively corresponding to N tiles Tile #1 to Tile #N. Each phase shifter group includes first to $M^{th}$ phase shifters for respectively performing phase shifting operations for M subcarriers. The first to $M^{th}$ phase shifters shift a phase of the input symbol according to different phase shifting values established in each phase shifter and transmit the input symbol to the first IFFT 30.

The second phase shifting unit 20 includes phase shifter groups $20a_1, \ldots,$ to $20a_N$ for processing input symbols respectively corresponding to the N tiles Tile #1 to Tile #N. Each phase shifter group includes first to $M^{th}$ phase shifters for respectively performing phase shifting operations for M subcarriers. The first to $M^{th}$ phase shifters shift a phase of the input symbol according to different phase shifting values established in each phase shifter and transmit the input symbol to the first IFFT 40.

The first IFFT 30 multiplexes the phase shifted symbol input from the plurality of phase shifters of the first phase shifting unit 10 to shift the phase shifted symbol to a time domain signal, and transmits the time domain signal to the antenna ANT #1. The second IFFT 40 multiplexes the phase shifted symbol input from the plurality of phase shifters of the second phase shifting unit 20 to shift the phase shifted symbol to the time domain signal, and transmits the time domain signal to the antenna ANT #2. The antennas ANT #1 and ANT #2 transmit the received signals to a receiving terminal.

That is, the respective phase shifting values of the first to $M^{th}$ phase shifters respectively included in the phase shifter groups $11a_1, \ldots,$ and $11a_N$ respectively corresponding to the N tiles Tile #1 to Tile #N included in the first phase shifting unit 10 are set to be different from each other, and the cyclic delay diversity transmission method is applied such that symbols having phases that are shifted by the same tile respectively have different phase shifting values, which is applied to the second phase shifting unit 20 as well. Accordingly, since the cyclic delay is increased over a predetermined level, the channel estimation performance at the receiving terminal for performing a channel estimation operation for each unit is deteriorated.

A signal transmitting method for maximizing the frequency diversity gain by improving the signal transmitting method in the conventional multiple antenna transmission system shown in FIG. 1 without deteriorating the channel will be described with reference to FIG. 2.

Figure 2:
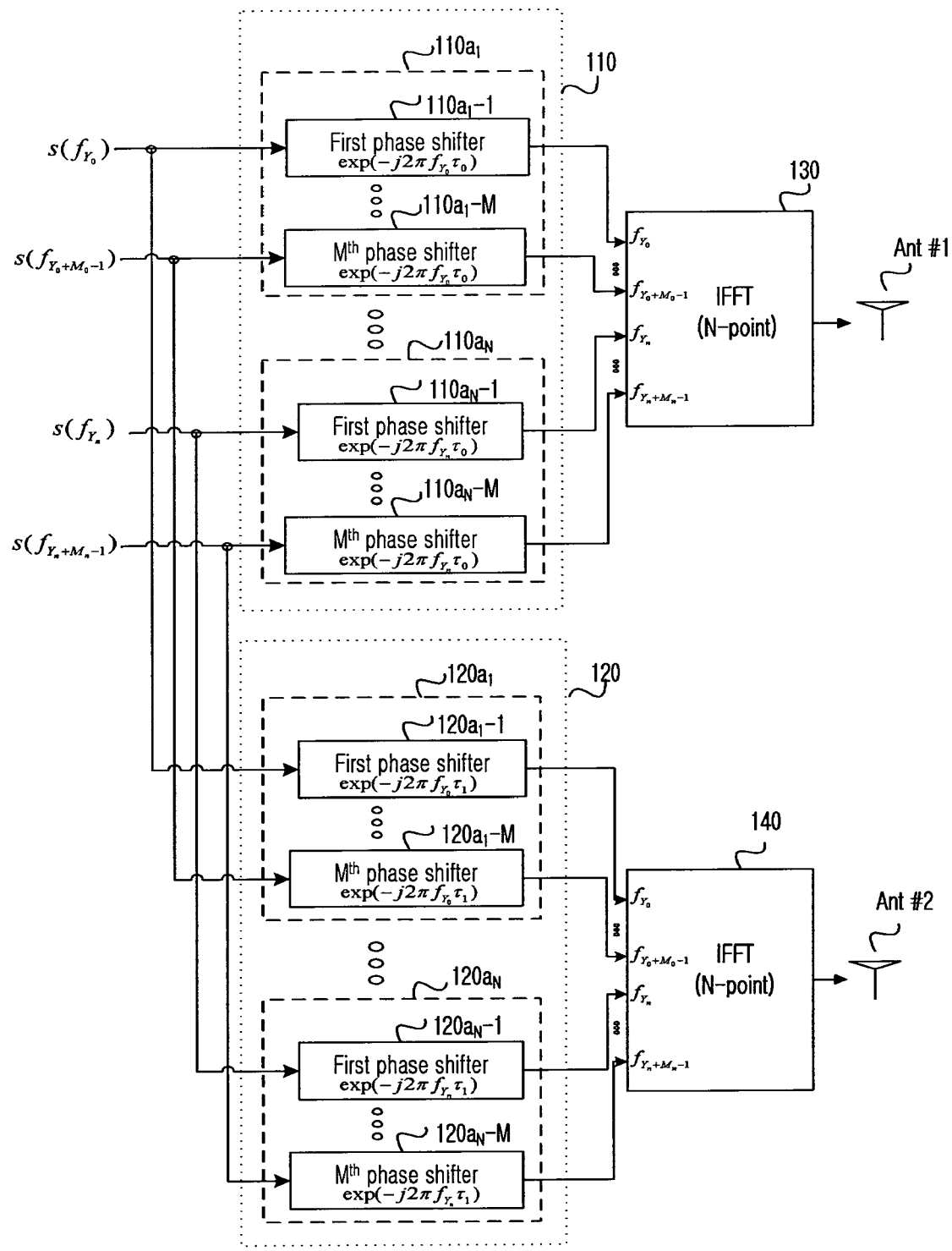
FIG. 2 is a block diagram representing a signal transmitting method using multiple antennas according to an exemplary embodiment of the present invention.

FIG. 2 is a block diagram representing a signal transmitting method using multiple antennas according to the exemplary embodiment of the present invention.

The multiple antenna transmission system according to the exemplary embodiment of the present invention shown in FIG. 2 includes first and second phase shifting units 110 and 120, first and second inverse fast Fourier transformers (IFFTs) 130 and 140, and a plurality of antennas ANT #1 and ANT #2.

The first phase shifting unit 110 for shifting a phase of an input symbol transmitted to the antenna ANT #1 to transmit the input symbol to the first IFFT 130 includes first to $N^{th}$ phase shifter groups $110a_1$ to $110a_N$ corresponding to first to $N^{th}$ tiles to process the input symbol corresponding to the N tiles Tile #1 to Tile #N. Here, the first phase shifter group $110a_1$ includes first to $M^{th}$ phase shifters $110a_1$-1 to $110a_N$-M for respectively shifting phases of M input symbols included in the first tile Tile #1, and the second to $N^{th}$ phase shifter groups $110a_2$ to $110a_N$ respectively includes M phase shifters. In addition, the M phase shifters in the first to $N^{th}$ phase shifter groups $110a_1$ to $110a_N$ shift the phase of the input signal according to the phase shifting value and transmit the input signal to the first IFFT 130.

The second phase shifting unit 120 for shifting the phase of the input symbol transmitted to the antenna ANT #2 to transmit the input symbol to the second IFFT 140 includes first to $N^{th}$ phase shifter groups $120a_1$ to $120a_N$ respectively corresponding to the first to $N^{th}$ tiles Tile #1 to Tile #N to process the input symbols corresponding to the N tiles Tile #1 to Tile #N. Here, the first phase shifter group $120a_1$ includes first to $M^{th}$ phase shifters $120a_1$-1 to $120a_N$-M for shifting the phases of M input symbols included in the first tile Tile #1, and the second to $N^{th}$ phase shifter groups $120a_2$ to $120a_N$ respectively include M phase shifters. In addition, the M phase shifters in the first to $N^{th}$ phase shifter groups $120a_1$ to $120a_N$ shift the phase of the input symbol according to the same phase shifting value and transmit the input symbol to the second IFFT 140.

The first IFFT 130 multiplexes the phase-shifted symbol to convert it to a time domain signal, and transmits the signal to the antenna ANT #1. The second IFFT 140 multiplexes the phase-shifted symbol to the time domain signal and transmits the signal to the antenna ANT #2. The antennas ANT #1 and ANT #2 transmit the received signal to a receiving terminal.

In a signal transmission method using the multiple antennas according to the exemplary embodiment of the present invention, one symbol is transmitted through the different antennas ANT #1 and ANT #2. Four input symbols $S(f_{Y_0})$, $S(f_{Y_0}^{+M-1})$, $S(f_{Y_n})$, and $S(f_{Y_n}^{+M-1})$ shown in FIG. 2 in the signal transmission method of the conventional multiple antenna transmission system will now be described.

The phase of the symbol $S(f_{Y_0})$ is shifted through the first phase shifter $110a1$-1 of the first phase shifter group $110a1$ in the first phase shifting unit 110 and the first phase shifter $120a1$-1 of the first phase shifter group $120a1$ in the second phase shifting unit 120. The phase of the symbol $S(f_{Y_0}^{+M-1})$ is shifted through the M phase shifter $110a1$-M of the first phase shifter group $110a1$ in the first phase shifting unit 110, and the M phase shifter of the first phase shifter group $120a1$ in the second phase shifting unit 120. The phase of the symbol $S(f_{Y_n})$ is shifted through the first phase shifter $110aN$-1 of the $N^{th}$ phase shifter group $110aN$ in the first phase shifting unit 110 and the first phase shifter $120aN$-1 of the $N^{th}$ phase shifter group $120aN$ in the second phase shifting unit 120. In addition, the phase of the symbol $S(f_{Y_n}^{+M-1})$ is shifted through the $M^{th}$ phase shifter $110a_N$-M of the $N^{th}$ phase shifter group $110a_N$ in the first phase shifting unit 110 and the M phase shifter $110a_N$-M of the $N^{th}$ phase shifter group $120a_N$ in the second phase shifter group 120.

That is, the phases of the respective symbols are respectively shifted by the different phase shifting units 110 and 120, and accordingly the phases are respectively shifted to different values to be transmitted through the antennas ANT #1 and ANT #2.

Different from the conventional multiple antenna transmission system shown in FIG. 1, in an input symbol process in the multiple antennas transmission system according to the exemplary embodiment of the present invention shown in FIG. 2, respective phase shifting values of the first to $N^{th}$ phase shifter groups $110a_1$ to $110a_N$ and $120a_1$ to $120a_N$ corresponding to the N tiles Tile #1 to Tile #N of the first and second phase shifting units 110 and 120 are set to be the same. That is, the phase shifting values in the phase shift group corresponding to one tile in one phase shifting unit among the first and second phase shifting units 110 and 120 are set to be the same, and therefore the input symbols in one tile in the signal transmitted through one antenna are shifted to the same phase values to be transmitted.

Different from the conventional multiple antenna transmission system shown in FIG. 1, in an input symbol process in the multiple antennas transmission system according to the exemplary embodiment of the present invention shown in FIG. 2, respective phase shifting values of the first to $M^{th}$ phase shifter groups $110a_1$ to $110a_N$ and $120a_1$ to $120a_N$ corresponding to the N tiles Tile #1 to Tile #N of the first and second phase shifting units 110 and 120 are set to be the same. That is, the phase shifting values in the phase shift group corresponding to one tile in one phase shifting unit among the first and second phase shifting units 110 and 120 are set to be the same, and therefore the input symbols in one tile in the signal transmitted through one antenna are shifted to the same phase values to be transmitted.

In addition, in FIG. 2, the phase shifting value of the phase shifter corresponding to a tile h among the phase shifters in the first to $N^{th}$ phase shifter groups $110a_1$ to $110a_N$ and $120a_1$ to $120a_N$ of the first and second phase shifting units 110 and 120 is $-2\pi f_{k_h}\tau_t$. In this case, $f_{k_h}$ may be set to be $f_{Y_h}$ that is a frequency of a subcarrier having the lowest frequency among the subcarriers in the tile, or it may be set to be $f_{Y_h}^{+M_h-1}$ that is a frequency of a subcarrier having the highest frequency among the sub-carriers in the tile. In addition, $f_{k_h}$ may be set to be $(f_{Y_h}+f_{Y_h}^{+M_h-1})/2$ that is an intermediate value between the frequency of the subcarrier having the highest frequency and the frequency of the subcarrier having the lowest frequency.

In addition, $\tau_t$ denotes a cyclic delay value allocated for each antenna, and is required to be set to sufficiently obtain a frequency diversity gain. The cyclic delay value of each antenna is set as follows. When the number of transmitting antennas is T, the cyclic delay values respectively corresponding to the first to $T^{th}$ antennas are $\tau_0, \tau_1, \ldots$ and $\tau_{T-1}$, and $\tau_0 < \tau_1 < \ldots < \tau_{T-1}, \tau_t - \tau_{t-1}$ (here, t=1, . . . , and T) are required to be designed to be greater than a maximum multipath delay value of a radio channel. Accordingly, the frequency diversity gain between tiles may be maximized since the channel estimation performance at the receiving terminal is not affected and a difference between cyclic delay values of antennas may be sufficiently increased.

In the signal transmission method using the multiple antennas according to the exemplary embodiment of the present invention, the cyclic delay diversity method is used between the different tiles, and the same phase shifting value is used between subcarrier input symbols corresponding to one tile in the same phase shifter group rather than using the cyclic delay diversity method. Accordingly, since the cyclic delay is maintained to be lower than a predetermined level, the channel estimation performance at the receiving terminal may be increased. In addition, since the difference between cyclic delay values of antennas may be sufficiently increased, the channel estimation performance at the receiving terminal may be improved while the frequency diversity gain may be maximized.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A signal transmission method using multiple antennas, the signal transmission method comprising:
grouping a plurality of subcarriers included in a frequency domain as a plurality of tiles including first and second tiles, each tile being basic resource management units including two or more subcarriers among the plurality of subcarriers;
shifting phases of subcarriers included in a first tile by a first phase shifting value, and shifting phases of subcarriers included in a second tile by a second phase shifting value that is different from the first phase shifting value;
generating a plurality of signals having different phase shifting values respectively corresponding to the antennas for the respective subcarriers by repeatedly performing the grouping of the subcarriers and the shifting of the phases of subcarriers included in the first tile and the second tile; and
multiplexing the plurality of signals to convert them to be time domain signals, and transmitting them through the antennas respectively corresponding to the plurality of signals.

2. The signal transmission method of claim 1, wherein, in the shifting of the phase, the first phase shifting value is $-2\pi f_{k_h}\tau_t$, and $f_{k_h}$ is a first frequency that is a frequency of the subcarrier having the lowest frequency among the subcarriers included in the first tile, a second frequency that is a frequency of the subcarrier having the highest frequency, or an intermediate value between the first and second frequencies (here, $1 \leq t \leq T$, $\tau^t$ denotes a cyclic delay value that is differently allocated to the antennas, and T is the number of antennas).

3. The signal transmission method of claim 1, wherein, in the generating of the signals, the different phase shifting values correspond to the cyclic delay values that are differently allocated to the respective antennas.

4. The signal transmission method of claim 3, wherein a difference between the cyclic delay values allocated to the first antenna and the second antenna is set to be greater than a multipath delay value of a radio channel.

5. A multiple antenna transmission system comprising:
two or more phase shifting units, each phase shifting unit including a plurality of phase shifter groups respectively corresponding to a plurality of tiles including a first tile and a second tile, a plurality of subcarriers included in a frequency domain being grouped into the plurality of tiles and each tile being basic resource management units including two or more subcarriers, the plurality of phase shifter groups for shifting phases of subcarriers included in the first tile by a first phase shifting value, and shifting phases of subcarriers included in the second tile by a second phase shifting value that is different from the first phase shifting value;

two or more inverse fast Fourier transform (IFFT) units corresponding to the two or more phase shifting units, respectively, each IFFT unit for multiplexing an output signal of one corresponding phase shifting unit, and converting the output signal to be a time domain signal; and two or more antennas corresponding to the two or more IFFT units, respectively, each antenna for transmitting the output signal of one corresponding IFFT unit, wherein each of the phase shifter groups includes two or more phase shifters for shifting phases of a plurality of input subcarriers by the same phase shifting values, and wherein the two or more phase shifting units generates output signals having different phase shifting values respectively corresponding to the two or more antennas for the respective subcarriers.

6. The multiple antenna transmission system of claim 5, wherein, the first phase shifting value is $-2\pi f_{k_h}\tau_t$, and $f_{k_h}$ is a first frequency that is a frequency of the subcarrier having the lowest frequency among the subcarriers included in the first tile, a second frequency that is a frequency of the subcarrier having the highest frequency, or an intermediate value between the first and second frequencies (here, $1 \leq t \leq T$, $\tau^t$ denotes a cyclic delay value that is differently allocated to the antennas, and T is the number of antennas).

7. The multiple antenna transmission system of claim 5, wherein the different phase shifting values correspond to cyclic delay values that are differently allocated to the respective antennas.

8. The multiple antenna transmission system of claim 7, wherein a difference between the cyclic delay values allocated to a first antenna and a second antenna is set to be greater than a multipath delay value of a radio channel.

* * * * *